(12) United States Patent
Perreard et al.

(10) Patent No.: US 8,459,444 B2
(45) Date of Patent: Jun. 11, 2013

(54) CONVEYING EQUIPMENT INCLUDING AT LEAST ONE CURVED CORRIDOR

(75) Inventors: Brice Perreard, Octeville-sur-Mer (FR); David Perrin, Octeville-sur-Mer (FR); Zmaj Petrovic, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 13/377,323

(22) PCT Filed: Jun. 10, 2010

(86) PCT No.: PCT/FR2010/051159
§ 371 (c)(1),
(2), (4) Date: Dec. 9, 2011

(87) PCT Pub. No.: WO2010/142918
PCT Pub. Date: Dec. 16, 2010

(65) Prior Publication Data
US 2012/0097504 A1   Apr. 26, 2012

(30) Foreign Application Priority Data

Jun. 11, 2009   (FR) ...................................... 09 53871

(51) Int. Cl.
*B65G 21/16*   (2006.01)
(52) U.S. Cl.
USPC ....................................... 198/836.4; 198/831
(58) Field of Classification Search
USPC .................................... 198/831, 836.1, 836.4
See application file for complete search history.

(56) References Cited

U.S. PATENT DOCUMENTS

| 1,176,228 A | 3/1916 | McIntosh |
| 2,425,158 A | 8/1947 | Masich |
| 2,615,555 A | 10/1952 | Carter |
| 3,554,353 A | 1/1971 | Raudat |
| 3,767,027 A | 10/1973 | Pund et al. |

(Continued)

FOREIGN PATENT DOCUMENTS

| DE | 87 14 605 U1 | 1/1988 |
| DE | 43 30 702 A1 | 3/1995 |

(Continued)

OTHER PUBLICATIONS

French Preliminary Search Report for FR0803276, dated Jan. 6, 2009.

(Continued)

*Primary Examiner* — Douglas Hess
(74) *Attorney, Agent, or Firm* — Sughrue Mion, PLLC

(57) ABSTRACT

The invention is an improvement to a conveying equipment that includes at least one curved corridor in which runs a queue of products moved by an endless mobile belt, said corridor being defined by: a first wall connected to the frame and having a first fixed curvature radius and a second wall mobile relative to said frame and having a second curvature radius that varies based on the products, said second mobile wall including: a guiding profile that may comprise several members, used as a friction surface and extending from an inlet up to an outlet of said curved corridor opposite said first fixed wall; a structure bearing said guiding profile, the structure including several segments connected to moving means, said segments being in abutment and distributed between the inlet and the outlet of the curved corridor and being movably housed in said guiding profile.

16 Claims, 11 Drawing Sheets

U.S. PATENT DOCUMENTS

| | | | | |
|---|---|---|---|---|
| 4,432,189 | A | * | 2/1984 | Raudat ............................... 53/497 |
| 5,090,556 | A | * | 2/1992 | Ach et al. .................... 198/465.1 |
| 5,211,280 | A | | 5/1993 | Houde |
| 5,237,795 | A | | 8/1993 | Cheney et al. |
| 5,291,988 | A | * | 3/1994 | Leonard ...................... 198/836.3 |
| 5,546,734 | A | | 8/1996 | Moncrief et al. |
| 6,050,396 | A | | 4/2000 | Moore |
| 6,059,096 | A | * | 5/2000 | Gladieux .................... 198/836.3 |
| 6,209,707 | B1 | * | 4/2001 | Ronchi ......................... 198/445 |
| 6,305,528 | B1 | | 10/2001 | Leonard |
| 6,378,695 | B1 | | 4/2002 | Rinne |
| 6,778,695 | B1 | | 8/2004 | Schellenberg et al. |
| 6,889,823 | B2 | | 5/2005 | Delaporte et al. |
| 7,246,697 | B2 | * | 7/2007 | Hosch et al. ................... 198/831 |
| 7,392,894 | B2 | | 7/2008 | Jacob et al. |
| 7,431,150 | B2 | * | 10/2008 | Ranger ...................... 198/836.3 |
| 7,530,453 | B2 | * | 5/2009 | Ingraham .................... 198/836.3 |
| 7,546,916 | B2 | * | 6/2009 | Jenny ............................ 198/831 |
| 7,607,531 | B2 | * | 10/2009 | Bonhomme et al. ........... 198/452 |
| 7,721,876 | B2 | * | 5/2010 | Hartness et al. ............ 198/836.3 |
| 7,832,549 | B2 | * | 11/2010 | Honeycutt .................... 198/831 |
| 7,926,648 | B2 | | 4/2011 | Petrovic et al. |
| 8,186,503 | B1 | * | 5/2012 | Burchell et al. ........... 198/836.3 |

| | | | |
|---|---|---|---|
| 2009/0223782 | A1 | 9/2009 | Martin et al. |
| 2010/0145109 | A1 | 6/2010 | Marion |
| 2011/0088997 | A1 | 4/2011 | Petrovic et al. |

FOREIGN PATENT DOCUMENTS

| | | |
|---|---|---|
| DE | 20 2005 001 689 U1 | 10/2005 |
| EP | 1 159 209 A1 | 12/2001 |
| FR | 1 420 368 A | 12/1965 |
| FR | 2 806 395 A1 | 9/2001 |
| FR | 2 918 973 A1 | 1/2009 |
| FR | 2 918 983 B1 | 12/2010 |
| GB | 758302 A | 10/1956 |
| GB | 896425 A | 5/1962 |
| WO | 00/17073 A1 | 3/2000 |
| WO | 2009/150379 A1 | 12/2009 |

OTHER PUBLICATIONS

International Search Report for PCT/FR2009/051097, dated Oct. 30, 2009.
International Search Report for PCT/FR2010/051160, dated Oct. 22, 2010.
Preliminary Search Report for Fr 0953871 dated Feb. 4, 2010.
International Search Report for PCT/FR2010/051159 dated Sep. 2, 2010.

* cited by examiner

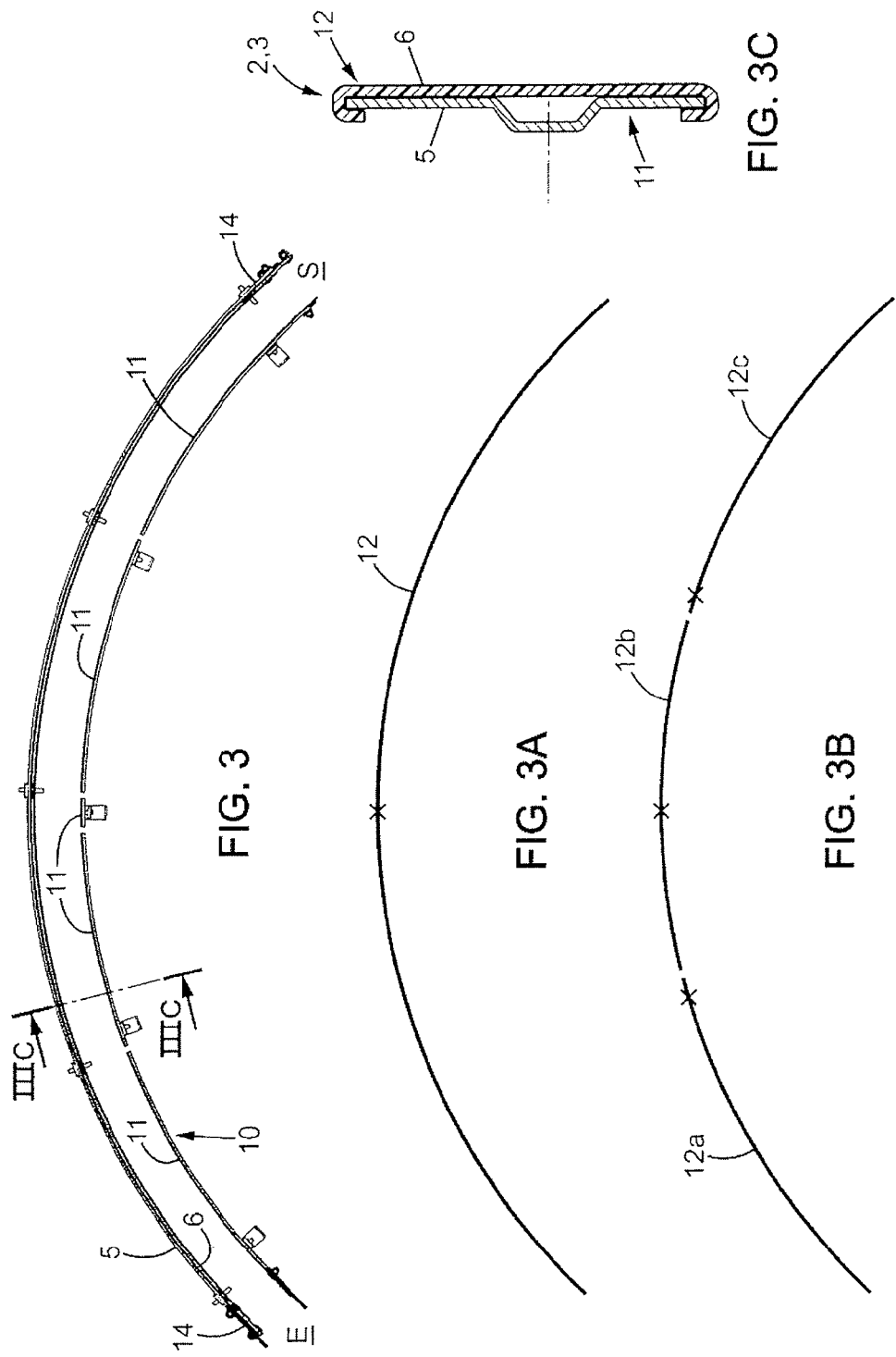

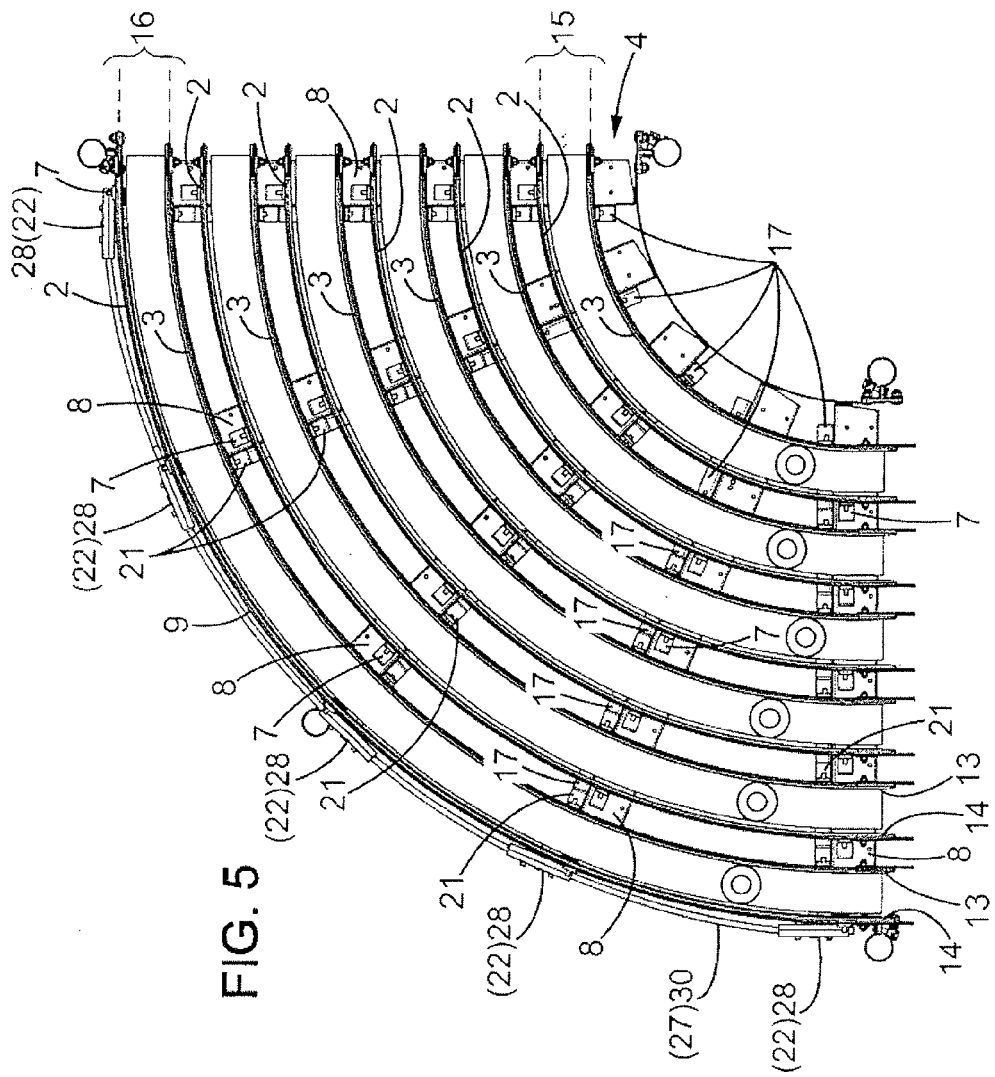

CONVEYING EQUIPMENT INCLUDING AT LEAST ONE CURVED CORRIDOR

CROSS REFERENCE TO RELATED APPLICATIONS

This application is a National Stage of International Application No. PCT/FR2010/051159 filed Jun. 10, 2010, claiming priority based on French Patent Application No. 09 53871, filed Jun. 11, 2009, the contents of all of which are incorporated herein by reference in their entirety.

The invention relates to a conveying system of the type which comprises at least one curved corridor of adjustable width.

A conveying system is known from document FR 2 806 395 which comprises at least one curved corridor in which a queue of products is conveyed. This corridor is delimited by a first lateral wall which is an integral part of the frame of the system and has a first fixed radius of curvature, and a second lateral wall which is radially mobile and is guided on said frame.

Document FR 2 806 395 mentions that the second mobile wall consists of a continuous guide which extends from the entrance to the exit of said curved corridor, facing said first fixed wall. This guide has a second radius of curvature which varies in size based on the diameter of said products, to allow moving said second lateral wall closer to or further away from said first lateral wall.

Such a system is in particular designed to guide bottles supported by the neck.

The invention aims to provide an alternative solution to the one described in document FR 2 806 395, better suited to conveying bottles which sit upright on a continuous conveyor belt, between two lateral walls.

Such systems are known. In particular, documents U.S. Pat. No. 5,211,280, DE 43 30 702, DE 2005 00168, and DE 87 14 605 describe systems comprising at least one corridor in which products are supported by their bottoms as they are conveyed. The corridor is delimited by two walls, at least one of them having a variable radius of curvature to allow increasing or decreasing the width of the corridor.

These documents all specify distributed guide supports, each connected to a means for moving them further apart from each other (enlarging the radius of curvature) or moving them closer together (shrinking the radius of curvature).

Such an embodiment requires changing the guide or removing the guide to change the radius of curvature. In other words, when the radius of curvature is to be changed, it is necessary to remove the guide, adjust the distributed supports to a desired position, and install longer or shorter guides depending on whether the radius of curvature is to be increased or decreased. To increase the width of a corridor, it is necessary to stop the system in order to replace the guide.

The guides can be made of elastic materials. However, when the supports are moved to increase or decrease the radius of curvature, the guides are stretched or bent. This can weaken the guides, or can cause problems in guiding the products which touch the guides.

The solution of the invention not only does not require stopping the system to change the width of the corridor, but it also overcomes the above disadvantages. The invention also proposes a more robust technical solution for conveyed products which exert greater pressure on the outside wall of the curve formed by the curved corridor due to centrifugal force.

The invention relates to a conveyor system, also referred to herein as conveyor equipment, comprising at least one curved corridor in which a queue of products is conveyed by a continuous conveyor belt, said corridor being delimited by:
a first fixed wall which is integrally attached to the frame and has a first fixed radius of curvature, and
a second wall which is mobile relative to the frame and has a second radius of curvature which varies according to the products, said mobile second wall consisting of:
a guide (also referred to herein as a guiding profile), which may comprise multiple elements, used as a friction surface and extending from the entrance to the exit of said curved corridor, facing said first fixed wall,
a structure which supports the guide, said structure consisting of several sections integrally attached to movement means, said sections being distributed between the entrance and the exit of the curved corridor and being in abutment and slidably seated in the guide, said guide forming a bridge between the sections of the structure.

The system of the invention comprises one or more corridors which are composite, meaning they consist, as described in document FR 2 918 983, of a rigid structural element and a flexible guide which encases said structural element. The curved wall with a variable radius of curvature has a dual thickness: one of the thicknesses is created by the thickness of the guide and the other thickness is created by the sections in abutment which extend along the entire length of the guide. This wall with variable radius of curvature is therefore more resistant than those of the systems described in the prior art (non-deformable for all practical purposes).

The sections slide in the guide between a position in which they are in abutment, and a position in which they are apart from each other but they each form an arc of a circle, each supporting a portion of the guide for a certain length. Thus it is unnecessary to provide supplemental supports for the guide when the radius of curvature is increased considerably, because the guide is not supported at specific points as in the prior art, but in multiple portions of the adjacent curves formed by the sections.

Aside from the section which is integrally attached to the guide, the sections slide within said guide when actuated by the movement means, to increase or decrease the radius of the second wall.

The distance between the two walls can thus be varied by actuating the movement means.

The invention may also comprise the following characteristics, singly or in combination:
the long sections are attached to the movement means at one of their ends;
the guide consists of a single continuous element between the entrance and exit of the curved corridor, integrally attached to the central section of the structure;
the guide consists of multiple elements fixed to the sections of the structure;
each of the sections of the structure is seated in the element of the guide, such that the elements of the guide form bridges between two sections of the structure;
the second radius of curvature is less than said first radius of curvature;
the mobile wall defines an arc of a circle having a radius varying between a maximum radius and a minimum radius, and the sections consist of curved plates defining an arc of a circle having an average radius between the maximum radius and the minimum radius;
the section movement means are able to move the sections in a transverse radial direction;

the section movement means of the mobile second wall consist of radial supports in the form of radially arranged U-section bars, each radial support comprising at least one bracket onto which a section is attached, said U-section radial support being guided relative to the frame by a system of slide rails and being actuated by an actuating mechanism;

the actuating mechanism of the U-section radial support comprises:
- a first mechanism for moving said U-section radial support, comprising:
  - a floating nut integrally attached to said U-section radial support, and
  - a radially arranged endless screw, guided in a guide sleeve integrally attached to the frame, and
  - a rotational driving means for driving said radial endless screw;

the rotational driving means for driving the radial endless screw comprises a toothed wheel driven by a threaded flexible shaft which runs inside a sheath along the side of the fixed exterior corridor, from toothed wheel to toothed wheel, between the U-section radial supports to be actuated;

the system comprises a bed made of thermoplastic material having at least one curved groove to guide the corresponding conveyor belt, said bed having openings to accommodate the passage of brackets for attaching the fixed and mobile walls; respectively the guide for the mobile wall has beveled ends which correspond to the adjacent guides, to ensure continuity in guiding the products regardless of their size;

the structure supporting the guide comprises sections, and the number of sections is related to the length of the corresponding corridor;

the structure supporting the guide comprises a short central section at or near the center of the curved corridor, and, on the part of the conveyor having the smallest radius of curvature, has two sections arranged on each side of said short central section, said sections being seated in the guide;

the structure supporting the guide has a short central section at or near the center of the curved corridor, and, on the part of the conveyor having the largest radius of curvature, has four sections arranged on each side of said short central section, said sections being seated in the guide.

The invention will be better understood by reading the description of several embodiments which will now be presented with reference to the attached drawings, in which.

Figure 1:
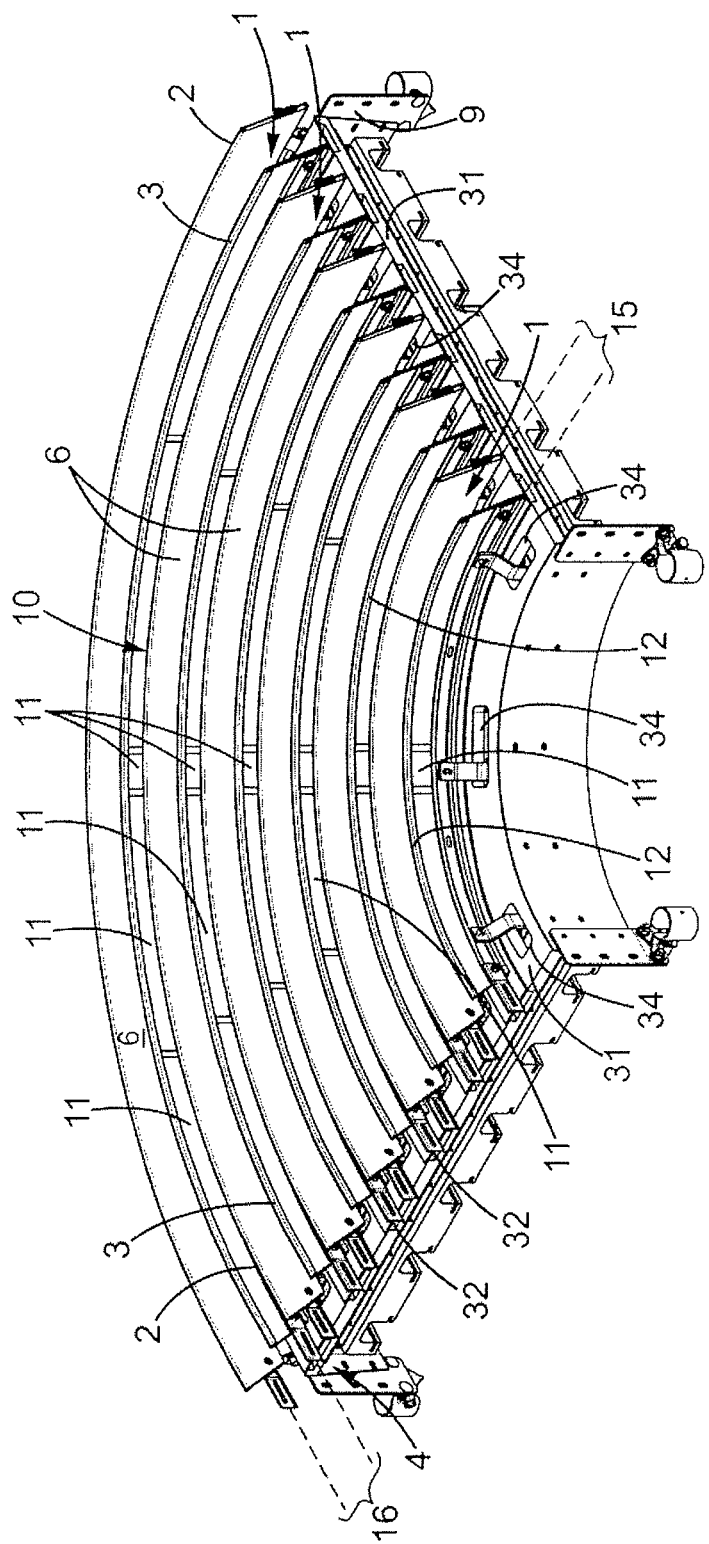
FIG. 1 shows a system of the invention from a perspective view.
Figure 2:
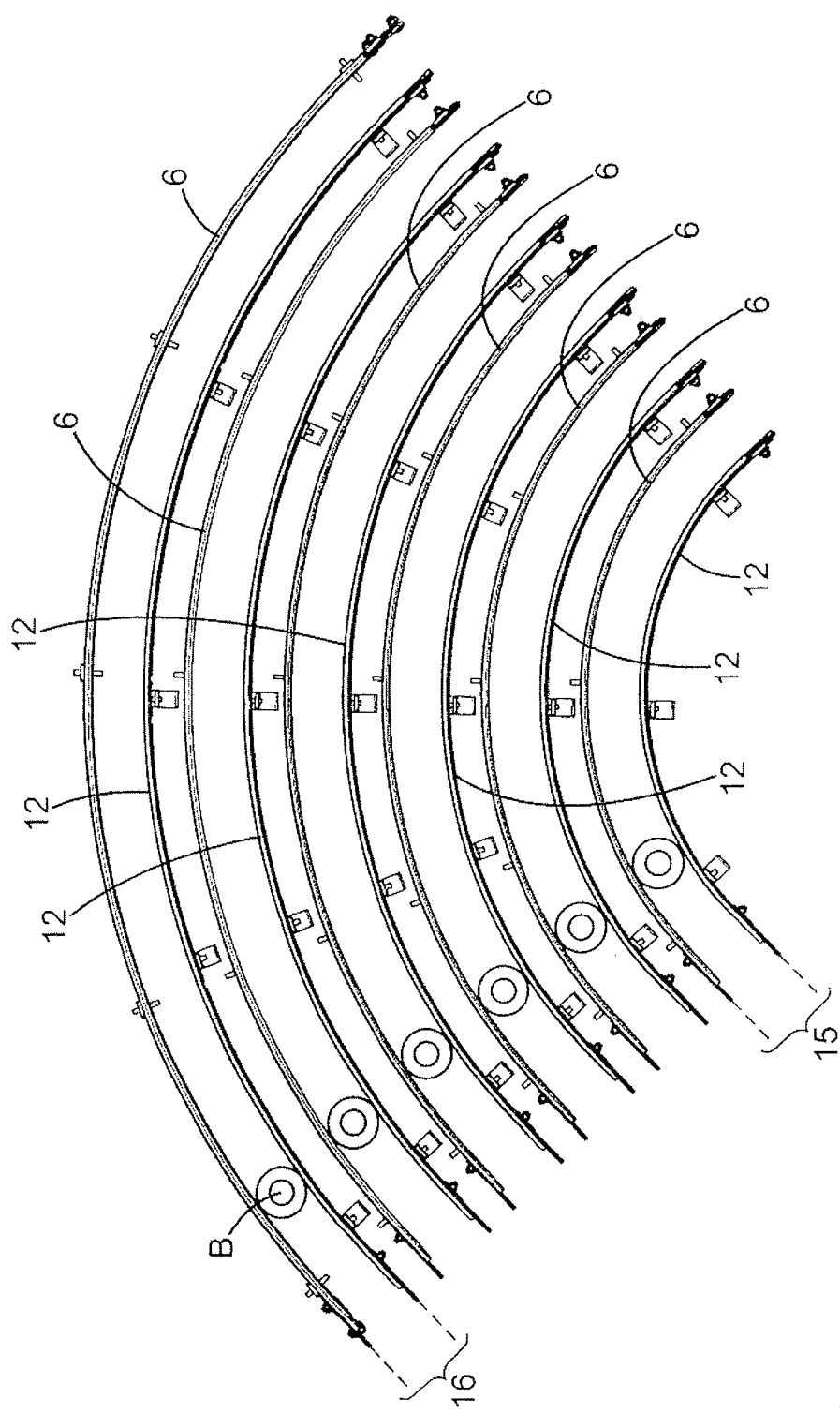
FIG. 2 illustrates the different corridors of the system of FIG. 1, in a top view.
Figure 3D:
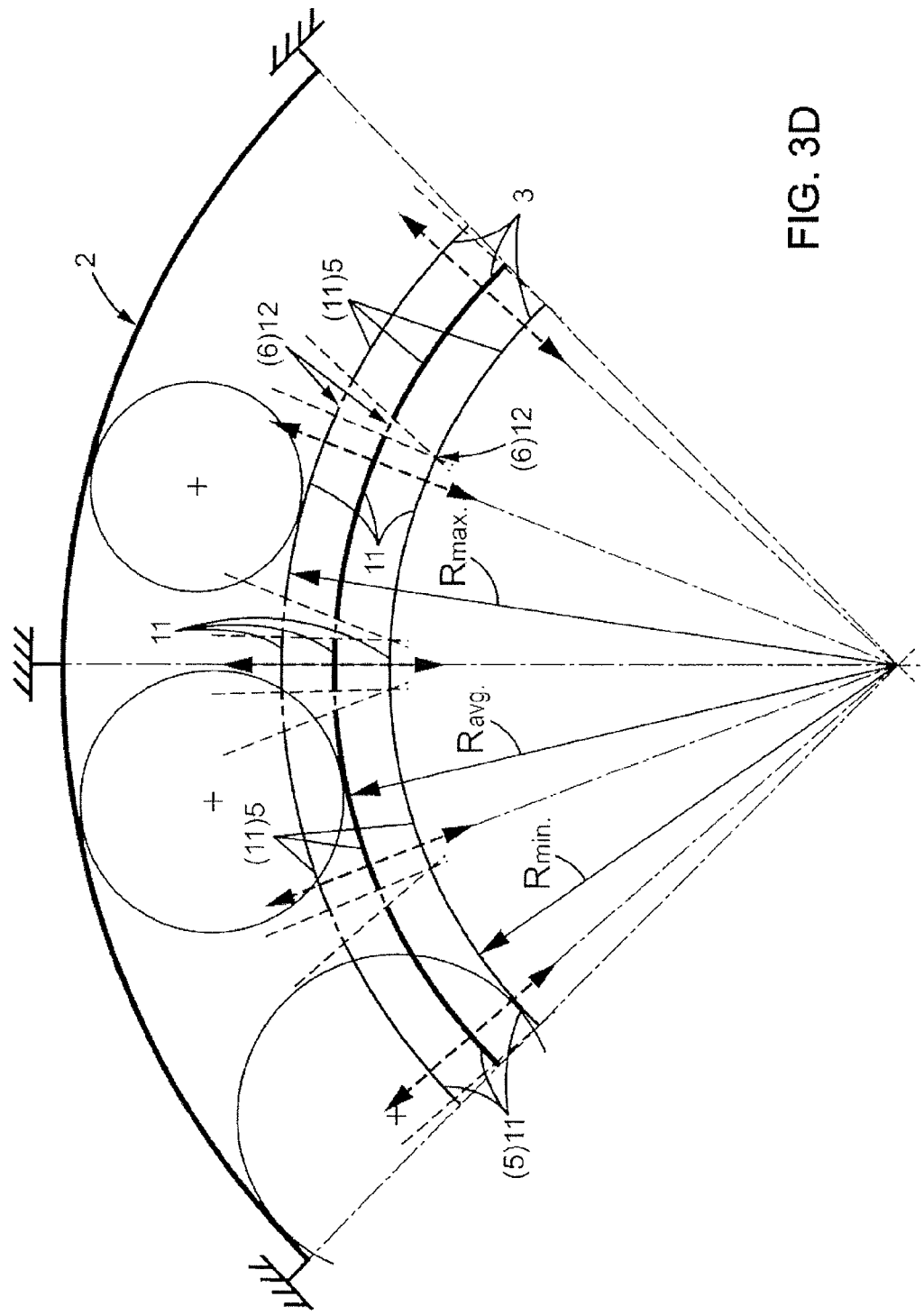
FIG. 3 shows the walls of the longest corridor of the system illustrated in FIGS. 1 and 2, from a top view, with the inner wall shown without its guide.
FIG. 3A shows the guide corresponding to the inner wall, consisting of a single continuous element.
FIG. 3B shows the guide for the inner wall, consisting of several elements.
FIG. 3C is a section of the wall represented in FIG. 3.
Figure 4A:
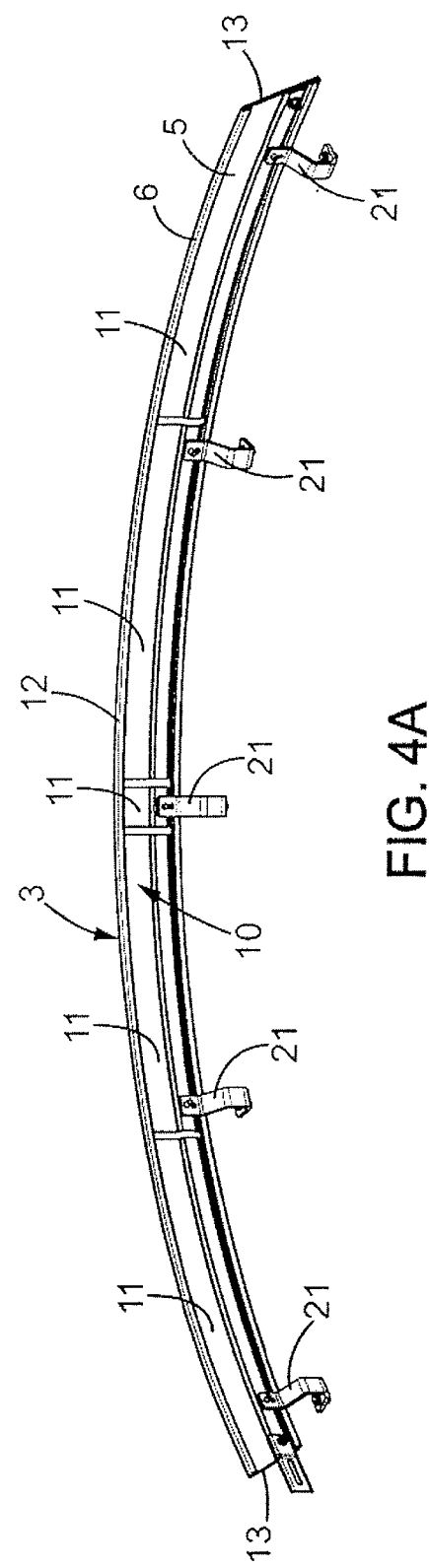
Figure 4B:
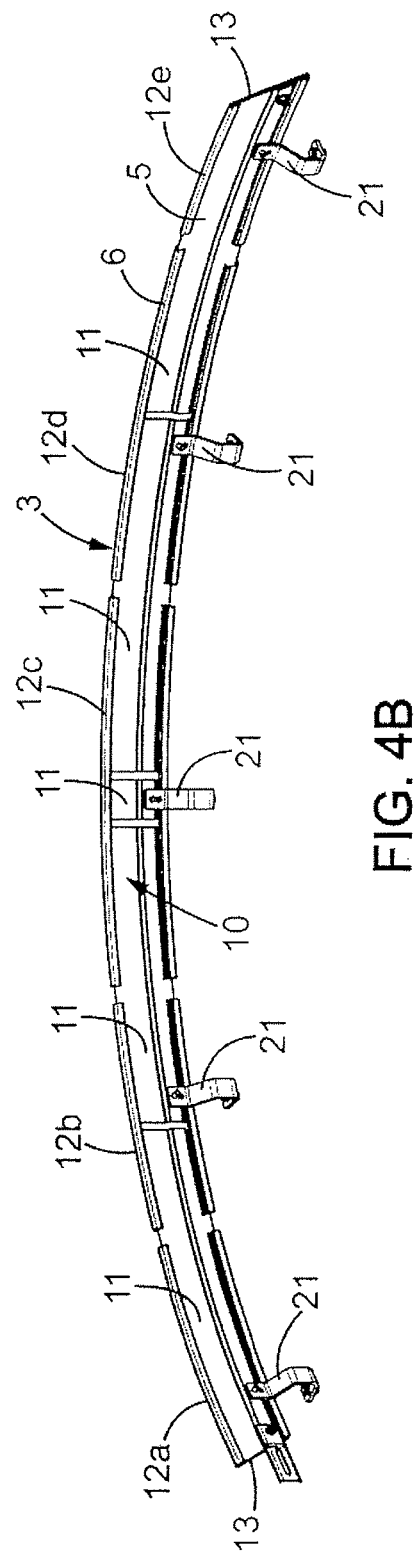
Figure 6:
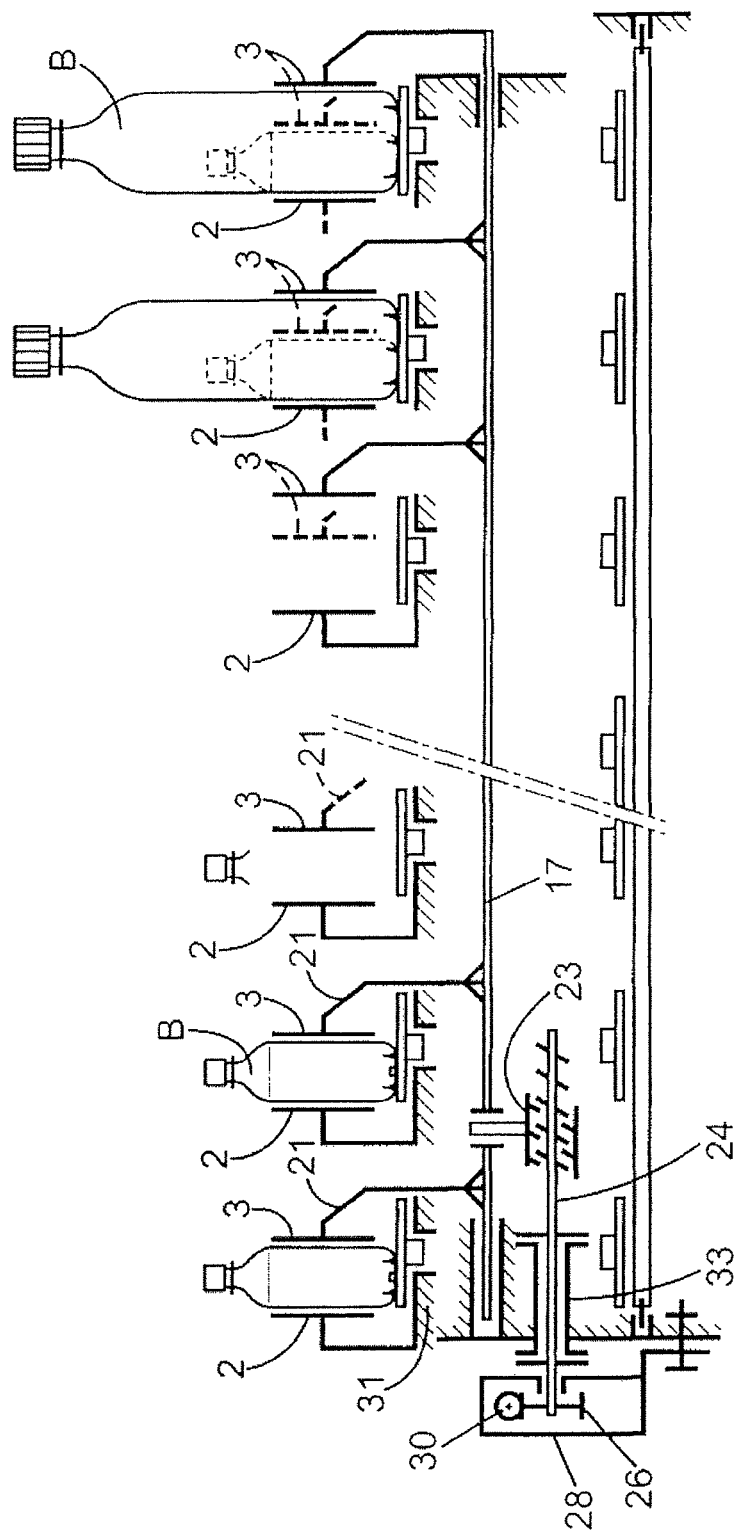
Figure 7A:
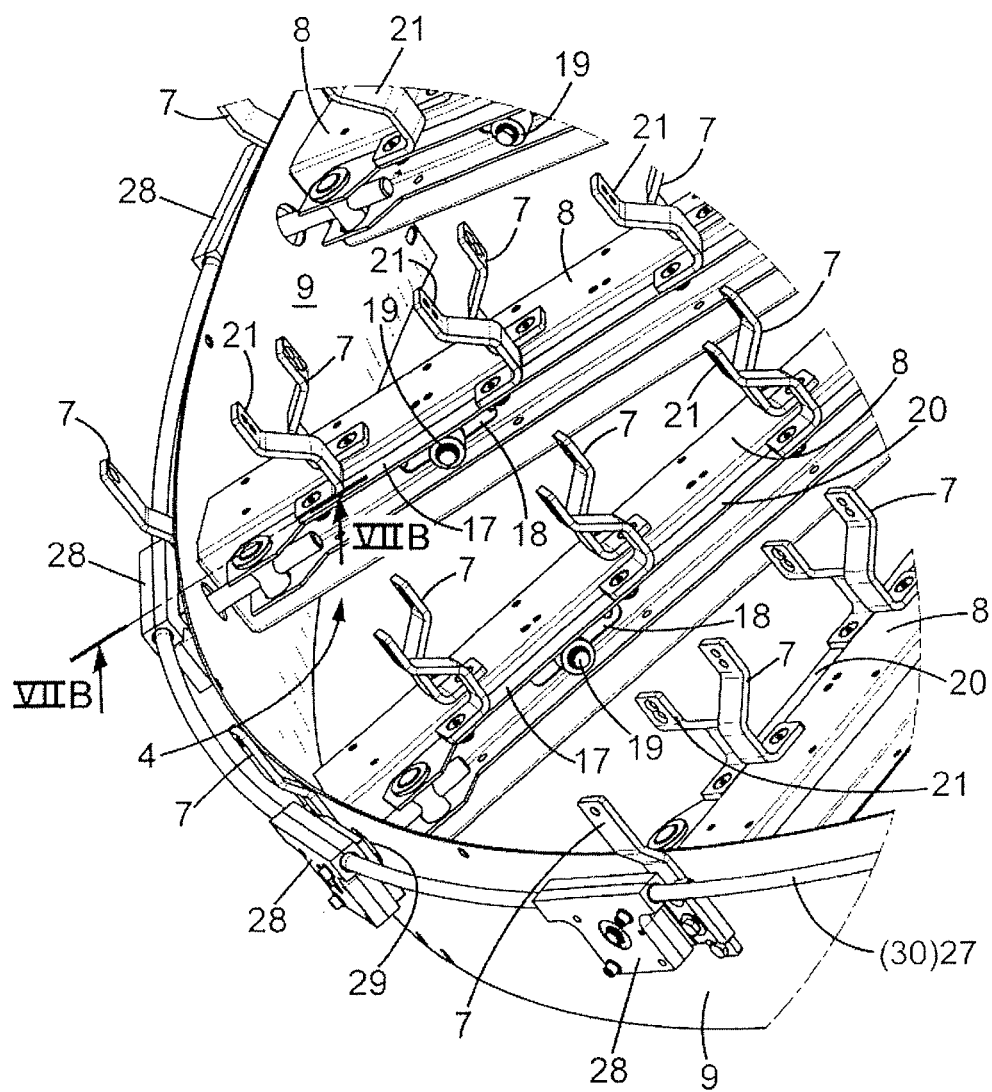
Figure 7B:
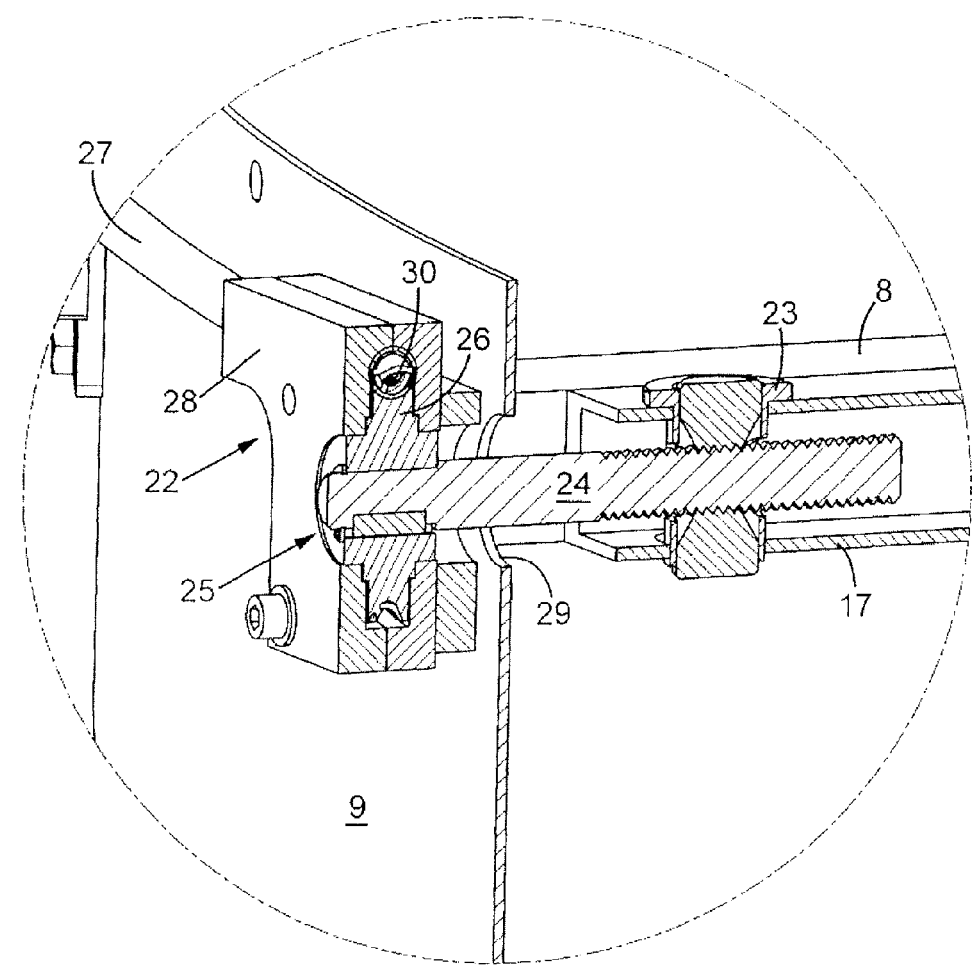
Figure 8:
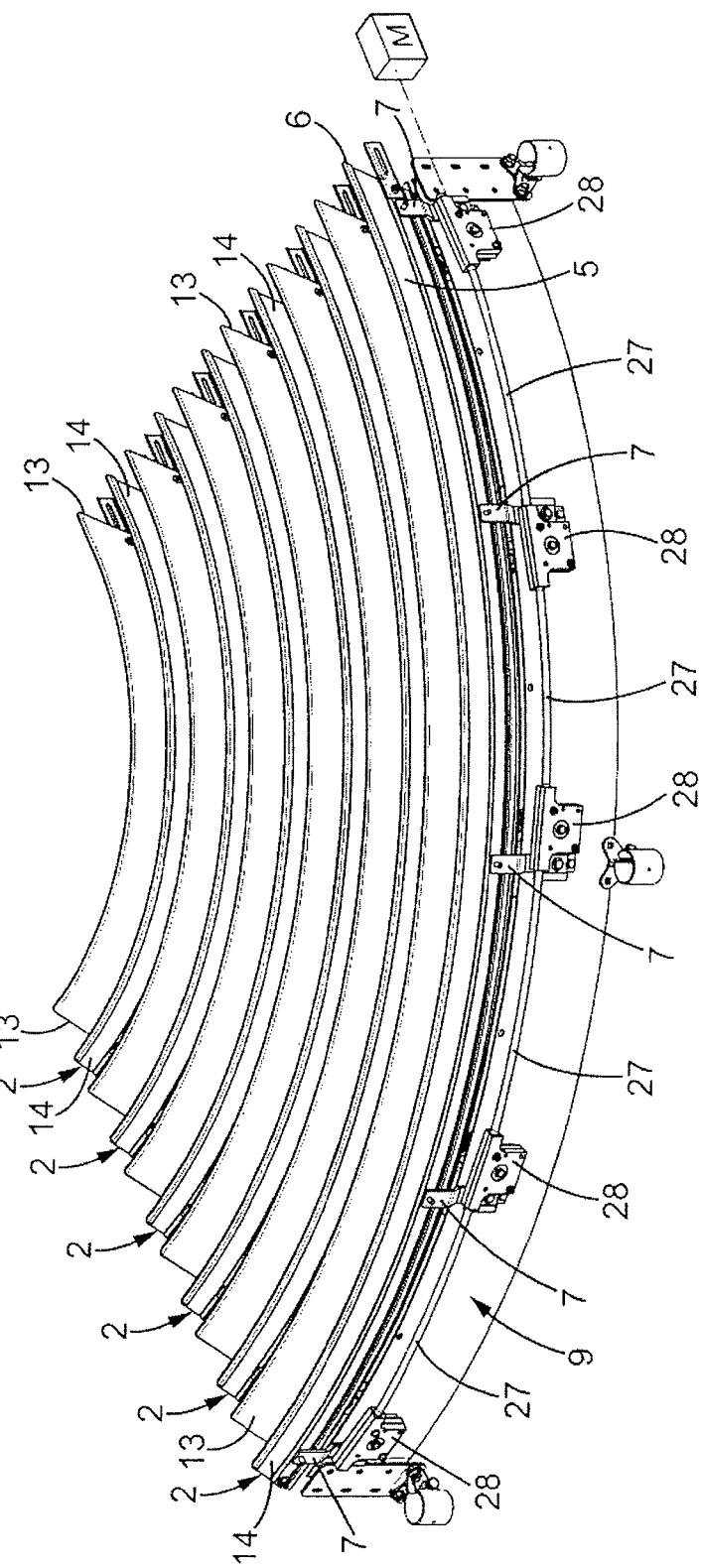

FIG. 3D schematically illustrates the different positions of the sections for the minimum radius and maximum radius of the arc of a circle defined by a mobile wall of a system according to the invention;

FIG. 4A shows a profile view of a mobile wall of a corridor, where the guide consists of a single element;

FIG. 4B shows a profile view of a mobile wall of a corridor, where the guide consists of several elements;

FIG. 5 is a top view of the system shown in FIG. 1, with the bed removed to show the frame;

FIG. 6 schematically illustrates a radial cross-section of a system of the invention, FIG. 7A is a partial illustration of a profile view of the system without the wall and bed, FIG. 7B is a cross-sectional view of FIG. 7A, along the axis labeled VII-VII, and FIG. 8 shows the system of FIG. 1 in a profile view, from a different viewpoint than in FIG. 1.

FIG. 1 shows a system of the invention, designed to convey bottles from one processing station to another. It comprises several corridors 1 which are curved, for example due to space limitations in the buildings where they are installed.

In the system of the invention, the bottles are conveyed in a queue in the corridors 1. Each corridor 1 has two lateral walls 2 and 3 facing one another.

In the invention, the wall 2 is fixed and the wall 3 is mobile. The fixed wall 2 has a fixed radius of curvature and the mobile wall 3 has a variable radius of curvature.

The spacing between the walls 2 and 3 of the corridors 1 can thus be adjusted to the different diameters of the bottles B to be conveyed (see FIG. 6).

The fixed wall 2 is an integral part of a frame 4 of the system, illustrated in more detail in FIG. 7A.

Each wall 2 has a metal core 5 inserted into and attached to a guide 6 (FIGS. 3 et 8), each guide 6 extending from the entrance E to the exit S of the curved corridor 1 which it delimits.

In addition, the core 5 of each wall 2 is fixed to the frame 4 by means of brackets 7.

As is shown in FIG. 7A, the brackets 7 are substantially angled, with one end attached to the frame 4 and the other end attached to the wall of the metal core 5 which is substantially vertical.

The brackets 7 can be of shapes which substantially vary depending on the location where they are attached to the frame 4.

Some of these brackets 7 are attached to a curved exterior wall 9 of the frame 4, which delimits the exterior of that portion of the system.

Other brackets 7, substantially different in shape from those attached to the curved wall 9, are attached at regular intervals to cross-pieces 8 of the frame.

The cross-pieces 8 form radii of the frame 4 and are also distributed at regular intervals along the curved portion of the system (see FIG. 5 in particular).

In the context of the embodiment now being described, it is the inner wall 3 which is made to be mobile.

However, it should be understood that the invention is not limited to this embodiment and the mobile wall could be the outer wall of the corridors while remaining within the scope of the invention.

In this embodiment, the inner wall was chosen to be the mobile wall 3 because the bottles B which are conveyed in the corridors 1 are supported by the outer wall of the corridors 1 due to the centrifugal force generated by their movement along this curved portion of the system.

The mobile wall 3 is thus the internal wall of the corridors 1; its radius of curvature is less than that of the fixed wall 2 with which it is associated to form a corridor.

The mobile wall 3 has a structure 10 consisting of several metal sections 11 (FIGS. 3 and 4A) which support a guide 12, said guide 12 extending from the entrance E to the exit S of the corridor that it delimits.

Depending on the length of the corridor between its entrance E and its exit S, the structure 10 may have three to five sections 11 for example, as can be seen in FIG. 1.

As represented in FIG. 3C, similarly to the fixed wall 2, the mobile wall 3 consists of a metal core 5 which is rigid and a guide 6 which is made of a relatively flexible thermoplastic material.

As will be understood from FIG. 3D, the mobile wall 3 defines an arc of a circle of variable radius.

When the mobile wall 3 is in a position where it is as far as possible from the fixed wall 2 in order to guide bottles Bg of large diameter, the arc of a circle which it defines has a minimum radius Rmin.

When the mobile wall 3 is in a position where it is as close as possible to the fixed wall 2 to guide bottles Bp of small diameter, the arc of a circle which it defines has a maximum radius Rmax.

The metal sections 11 are rigid and are assembled to slide within the guide 12.

As can be seen in FIG. 3D, the sections 11 (which are shown without the guide 12 of the mobile wall 3), define an arc of a circle having a radius Rmoy to guide bottles Bm of average diameter. The radius of curvature of the metal sections 11 is average relative to said minimum radius Rmin and maximum radius Rmax.

The sections 11 are sufficiently rigid to force said guides 12 into the shape which defines the arc of the required radius, according to the position of the mobile wall 3 relative to the fixed wall 2.

When the radius of curvature changes, the guide 12 acts as a bridge and hinge between the ends of two adjacent sections 11.

As is seen in the embodiment illustrated in FIG. 1, in the part 15 of the conveyor having the smallest radius of curvature, two sections 11 are arranged on each side of the short central section 11. The guide 12 can consist, for example, of a single element which is attached to this central section as shown in FIG. 3A.

On the part 16 of the conveyor having the largest radius of curvature (FIG. 1), there are several sections 11, for example four sections, arranged on each side of the short central section 11.

In this case, the guide 12 can consist of several elements, as is shown in FIG. 3B. Another embodiment is illustrated from a perspective view in FIG. 4B.

The guide 12 can thus comprise several elements in abutment, denoted 12a, 12b, 12c in FIG. 3B, and 12a, 12b, 12c, 12d and 12e in FIG. 4B.

In FIG. 3B, the central element 12b is attached to the section 11 and the other elements 12a and 12c are attached to the adjacent sections 11. Preferably, as shown in FIG. 3, the sections 11 are attached at or near one of their ends.

It is understood that the structure 10 could comprise a different number of sections 11 and that the sections 11 could be made of a material other than metal, while remaining within the scope of the invention.

The central section 11 of the structure 10, meaning the section 11 which is substantially at mid-distance between the entrance E and the exit S of the corridor 1, serves to anchor the guide 12.

The ends 13 of the guides 12 (FIG. 4A), and the ends 14 of the guides 6 (FIG. 3), are beveled in a direction parallel to that of the beveled ends of adjacent guides (see FIG. 4A). In this manner, when the ends 13 and 14 of the respective guides 12 and 6 are connected to the ends of the adjacent guides, for example straight guides, their ends ensure that continuity in guiding the bottles is maintained regardless of the dimensions of the bottles, because, in this configuration, the wall of the bottle is always in contact with at least one of the connected ends of the guides.

The guide 12 is made of a relatively resistant thermoplastic material to withstand the friction from the conveyed bottles, but still has a certain flexibility to allow it to adopt different radii of curvature when the means for moving the sections 11 are actuated. The guide 12 assumes the curvature imposed by the sections 11.

Each section 11 is integrally attached to movement means which will now be presented with reference to FIGS. 7A and 7B.

The movement means, which move the sections 11, comprise sliding rails 17, each rail being in the form of a U-section bar that serves as a support 17 for the sections 11 and being arranged radially in the system. For clarity in the following description, the supports 17 will be referred to as "radial supports" to distinguish them from the other supports referred to as brackets.

The U-section radial supports 17 are assembled to allow translational movement relative to the cross-pieces 8 of the frame.

To achieve this, the U-section radial supports 17 each comprise at least one longitudinal through hole 18 in the form of a slot of a given length, this given length defining the maximum travel of the U-section radial support 17 relative to the cross-piece 8.

A roller 19, attached to the cross-piece 8, moves freely on an axle which acts as a guide for the radial support 17 as it moves between the two ends of the slot 18.

The radial supports 17 are U-section supports. It is the bottom of this U which has said slots 18, and this bottom lies against a surface of the cross-piece 8.

The sections 11 of the structure 10 are attached to an arm 20 of the U-section radial support 17 by means of attaching brackets 21 (see FIGS. 4A, 5, and 7A), with the arm 20 forming a radial cross-piece.

The translational motion of the U-section radial support 17 is controlled by an actuating mechanism 22 which will now be described with reference to FIG. 7B in particular.

The actuating mechanism 22 has a first mechanism for moving the radial support 17, comprising a floating nut 23 fixed to the U-section radial support 17, and an endless screw 24. This is schematically illustrated in FIG. 7B.

The endless screw 24 is arranged radially and can be guided in a guide sleeve or bearing 33 integrally attached to the frame 4 (FIG. 6).

The endless screw 24 is connected to a rotational driving means 25.

The driving means 25 comprises a toothed wheel 26 which is integrally attached to the endless screw 24. The toothed wheel 26 is associated with a flexible threaded shaft 30 (represented schematically in FIG. 6). This shaft 30 extends along the side of the fixed exterior corridor, or in other words along the side of the curved wall 9 delimiting the exterior of the curved system, and it extends from toothed wheel to toothed wheel 26 between the radial supports 17 (or sliding rails), as is shown in FIG. 8 in particular.

Preferably, to avoid damage to the flexible shaft 30, it is within a sheath 27.

Similarly, to avoid damage to the toothed wheel 26, it is enclosed in a housing 28.

The housing 28 is fixed to the curved exterior wall 9 of the system and is designed to easily open and close for easier maintenance of the parts it encloses.

The curved exterior wall 9 has through holes 29 to accommodate the passage of the endless screw 24 integrally attached to the toothed wheel 26.

The rotation of the threaded shaft 30 is controlled at the end of the flexible shaft by an electric motor (represented in FIG. 8), in either direction of rotation, such that the toothed wheel 26 can be driven in one direction or the other to move the mobile wall 3 closer to or further away from the fixed wall 2.

To advance the queues of bottles in the corridors 1, the system has a bed 31 (FIG. 1), made of a thermoplastic material, which has through holes 34 to accommodate the brackets 7 and 21 which respectively attach the walls 2 and 3 of the corridors 1.

There are curved grooves 32 in the bed 31 (FIG. 1), each for guiding a conveyor belt (not represented).

The conveyor belt is a continuous belt and has not been represented in the figures for simplicity and clarity.

It is understood that the above describes how the invention can achieve its aims, particularly the aim of providing means for adjusting the width of the corridors to the size of the bottle (see FIG. 6 in particular).

However, it should be understood that the invention is not limited to the specific embodiment described above, and that it extends to any equivalent embodiment.

The invention claimed is:

1. A conveying system comprising at least one curved corridor in which a queue of products is conveyed by a continuous conveyor belt, said corridor being delimited by:
    a first fixed wall which is integrally attached to a frame and has a first fixed radius of curvature, and
    a second wall which is mobile relative to said frame and has
        a second radius of curvature which varies according to the products, said second mobile wall comprising:
            a guide, comprising at least one element, used as a friction surface and extending from an entrance to an exit of said curved corridor, facing said first fixed wall,
            a structure which supports said guide, said structure comprising several sections integrally attached to movement means, said sections being distributed between said entrance and said exit of said curved corridor and being in abutment and slidably seated in said guide, said guide forming a bridge between said sections of said structure.

2. The system according to claim 1, wherein long sections are attached to said movement means at one of the ends of said long sections.

3. The system according to claim 1, wherein said guide comprises a single continuous element between said entrance and said exit of said curved corridor, integrally attached to a central section of said structure.

4. The system according to claim 1, wherein said guide comprises multiple elements fixed to said sections of said structure.

5. The system according to claim 4, wherein each of said sections of said structure is partially seated within two adjacent elements of said guide to ensure continuity.

6. The system according to claim 1, wherein said second radius of curvature is less than said first radius of curvature.

7. The system according to claim 1, wherein said mobile wall defines an arc of a circle having a radius varying between a maximum radius and a minimum radius, and wherein said sections comprise curved metal plates defining an arc of a circle having an average radius between said maximum radius and said minimum radius.

8. The system according to claim 1, wherein means which move said sections are able to move said sections in a transverse radial direction.

9. The system according to claim 8, wherein said means which move said sections of said mobile second wall comprises radial supports in the form of radially arranged U-section bars, each radial support comprising at least one bracket onto which a section is attached, said U-section radial support being guided relative to said frame by a system of slide rails and being actuated by an actuating mechanism.

10. The system according to claim 9, wherein said actuating mechanism of a U-section radial support comprises:
    a first mechanism for moving said U-section radial support, comprising:
    a floating nut integrally attached to said U-section radial support, and
    a radially arranged endless screw, guided in a guide sleeve integrally attached to said frame, and
        a rotational driving means for driving said radial endless screw.

11. The system according to claim 10, wherein said rotational driving means for driving said radial screw comprises a toothed wheel driven by a threaded flexible shaft which runs inside a sheath along a side of a fixed exterior corridor, from toothed wheel to toothed wheel, between said U-section radial supports to be actuated.

12. The system according to claim 9, comprising a bed made of thermoplastic material having at least one curved groove to guide a corresponding conveyor belt, said bed having openings to accommodate the passage of brackets for attaching said fixed and mobile walls.

13. The system according to claim 1, wherein said guide for said mobile wall has beveled ends which correspond to adjacent guides, to ensure continuity in guiding the products regardless of the size of the products.

14. The system according to claim 1, wherein said structure supporting said guide comprises sections, and the number of sections is related to the length of said at least one curved corridor.

15. The system according to claim 14, wherein said structure supporting said guide has a short central section at or near a center of said at least one curved corridor, and, on a part of the conveying system having a smallest radius of curvature, has two lateral sections arranged on each side of said short central section, said lateral sections being seated in said guide.

16. The system according to claim 14, wherein said structure supporting said guide has a short central section at or near a center of said at least one curved corridor, and, on a part of the conveying system having the largest radius of curvature, has four lateral sections arranged on each side of said short central section and seated in said guide.

* * * * *